2,820,835

CATALYTIC REACTIONS OF OLEFINS

Edwin F. Peters, Lansing, Ill., and Bernard L. Evering, Chicago, Ill., assignors to Standard Oil Company, Chicago, Ill., a corporation of Indiana No Drawing. Application August 18, 1955
Serial No. 529,322

2 Claims. (Cl. 260—683.51)

This invention relates to the catalytic reaction of olefins and in particular it concerns the synthesis of hydrocarbons by reaction of olefins and hydrocarbons having a tertiary hydrogen atom.

Olefins have been utilized in a number of different processes to produce hydrocarbons having a higher molecular weight than the feed olefins. The principal processes employed by the petroleum refiners have been polymerization and alkylation. The polymerization process, viz., polymerization of propene, butenes, pentenes, etc. to higher molecular weight polymers, especially gasoline-boiling range polymers, suffers from the basic disability that only olefins enter into the reaction. The alkylation process overcomes this disability by reacting olefins with an isoparaffin such as isobutane to produce gasoline-boiling range hydrocarbons. The commercial alkylation processes, however, almost all require the use of very strong and highly corrosive acids as the catalytic materials, e. g., concentrated $H_2SO_4$, HF, phosphoric acid-$BF_3$ complexes or the like which are exceedingly difficult to handle.

An object of this invention is to provide a new and useful catalyst for effecting reactions involving olefins and isoparaffins. Another object is to provide a simplified process for synthesizing hydrocarbons from olefins and isoparaffins wherein a solid catalyst is used. A further object is to provide a method and means for producing gasoline-boiling range hydrocarbons from olefins and isoparaffins which uses a solid catalyst which minimizes corrosion, simplifies contacting methods, is not degraded during the process, enables higher ultimate yields based on olefins, and has other advantages over commercial alkylation processes. Additional objects and advantages of the present invention will be apparent from the more detailed description thereof which follows.

It has been discovered that an adsorbent carrier containing between about 1 and 25% by weight of the combined oxides of cobalt and molybdenum and between 0.5 and 20% by weight of HF is highly effective for catalyzing reactions involving olefins and isoparaffins. While it is not our intention to be bound by any theory it is believed that the catalyst assists in the condensation of olefins and also assists in the saturation of some of the polymers thereof by transfer of the highly labile tertiary and adjacent hydrogen atoms from the isoparaffins. While various molecular weight olefins may be employed in the reaction it is preferred to use the normally gaseous olefins such as propene and butenes. The preferred isoparaffin is isobutane. However liquid olefins and isoparaffins boiling up to about 300° F. may be used. The preferred catalyst consists essentially of between about 1 and 10% by weight of cobalt oxide, between about 2 and 15% by weight of molybdenum oxide and between about 2 and 10% by weight of HF supported on an alumina carrier. The molar ratio of isobutane to olefin used may vary between 1:10 to 30:1, preferably between 1:1 to 10:1. The operating temperature of the reaction may be between about 50° and 500° F., preferably between about 150° and 400° F. At least a substantial portion of the reactants are maintained in the liquid phase, suitably by applying a pressure of between 50 and 2000 p. s. i. g. to the reactants. Space velocities of between 0.1 to 10 liquid volumes of hydrocarbon per volume of catalyst per hour may be used.

While it has been known that a catalyst which consists essentially of the combined oxides of cobalt and molybdenum as the active components supported on an adsorbent carrier is useful in polymerizing olefins, we have discovered that the addition of HF to such a catalyst enables it to catalyze reactions of olefins and isoparaffins as well. For example, if a mixture of butenes and isobutane are contacted with a cobalt oxide-molybdenum oxide-alumina catalyst, the olefins are polymerized to produce a highly unsaturated product. In such a reaction the yield of polymer can never be more than 100% by weight based on the amount of olefins in the feed, and as a practical matter does not reach such a high level. However, if HF is added to the catalyst the yield of liquid products based on olefins in the feed is more than 100% by weight. It has been shown that the HF promotes the catalyst in a fashion which enables the catalyst to catalyze reactions involving the isobutane. Such an improved solid catalyst for effecting the reactions of olefins and isoparaffins has been eagerly sought after by research workers in the petroleum art.

The catalyst used in our invention contains the oxides of cobalt and molybdenum along with HF as the active and essential components. It may consist of between about 1 and 25% by weight of the combined oxides of cobalt and molybdenum and between about 0.5 and 20% by weight of HF supported on an adsorbent carrier. It contains the molybdenum oxide usually in a higher percentage than the cobalt oxide. Suitable catalysts may contain about 1 to 10% cobalt oxide, about 2 to 15% molybdenum oxide and about 2 to 10% of HF. Wherever percentages are expressed herein and in the appended claims they are to be understood to mean a weight basis unless otherwise indicated. While the amount of cobalt oxide and molybdenum oxide have been expressed herein in terms of amounts of CoO and $MoO_3$, this should not be construed to indicate that the cobalt and molybdenum exist only in the form of these compounds in the catalyst. The oxides of cobalt and molybdenum may exist in a more highly oxidized or a more reduced form. The adsorbent carrier may be one such as alumina, bauxite, zirconia or titania. Activated alumina is preferred. The catalyst may contain minor amounts of other materials such as silica (which is frequently employed in amounts of 3 to 7% as a stabilizer for the alumina), graphite (which is often employed as a binder when preparing catalyst in pelleted form), or the like. While the catalyst may contain HF in a varied amount, the activity of the catalyst for catalyzing reactions involving isoparaffins varies proportionately, to some extent, with the amount of HF contained in the catalyst. There appears to be a lower threshhold requirement of about 0.5 to 1% of HF which is necessary in order to cause the reaction to proceed to a desirable degree. If more than 20% by weight of HF is contained in the catalyst the cracking tendencies of the catalyst increase rapidly, particularly if used at the higher temperatures e. g. 400° to 500° F. Satisfactory operations are usually obtained if 2 to 10% of HF is contained in the catalyst.

The method of preparing the catalyst is not critical. A highly convenient way is to first prepare an alumina-supported cobalt oxide-molybdenum oxide catalyst. Such compositions have been employed as catalysts in hydrodesulfurizing petroleum oils. Many methods for preparing them have been detailed in the prior art. Catalyst manufacturing techniques such as coprecipitation, cogelation, impregnation and the like may be used in their manufacture. For example, activated alumina pellets or granules may be impregnated with the proper amounts of aqueous solutions of water soluble cobalt compounds such as cobalt nitrate and water soluble molybdenum compounds, such as ammonium molybdate. The composition is then dried and calcined at an elevated temperature e. g., 1000° F., whereupon the cobalt and molybdenum compounds are decomposed to their oxides. A double impregnation technique is taught in U. S. 2,687,381 to G. W. Hendricks. A preferred method consists of preparing a molybdenum oxide-alumina catalyst (such as have been used for many years as hydroforming catalysts and which may be prepared by precipitating aqueous solutions of soluble molybdenum and aluminum compounds, drying, and calcining) and impregnating the molybdenum oxide-alumina hydroforming catalyst with an aqueous solution of a soluble cobalt salt, drying and then calcining.

Any of a number of different techniques may be used for incorporating HF within the finished catalyst composition. The preferred technique consists of impregnating the calcined cobalt oxide-molybdenum oxide-alumina with a calculated volume of an aqueous solution of HF of the desired concentration so that upon evaporation of the water, the catalyst is impregnated with the desired amount of HF. Aqueous HF solutions having 5 to 50% HF are useful for the impregnation. After evaporating the mixture the catalyst must be dried and calcined, usually at about 800° to 1200° F. for about 0.25 to 5 hours. Because the HF seems to be very rapidly absorbed from its aqueous solution by the cobalt oxide-molybdenum oxide-alumina, it may not always be necessary to evaporate the impregnating solution to dryness. Indeed, after an impregnation time of two hours or so the aqueous solution may be decanted and the catalyst pellets, pills, or granules may then be dried and calcined. HF may also be incorporated within the finished catalyst composition by treating calcined cobalt oxide-molybdenum oxide-alumina with anhydrous HF. The gaseous HF is preferably diluted with an inert gas such as nitrogen, flue gas, or the like and the dilute HF passed through a bed of cobalt oxide-molybdenum oxide-alumina catalyst. A particularly preferred method of incorporating the HF consists of adding the HF in small amounts to the feed or otherwise introducing it into the reaction zone where it is adsorbed in the bed of catalyst. The content of HF in the catalyst can thus be built up to the desired amounts over a period of time which depends upon the amount of HF, which is preferably 10 to 500 parts per million, added to the feed hydrocarbons. The HF promoter can be incorporated in the catalyst during an earlier stage of its manufacture. For instance, the carrier may be treated with HF followed by incorporating the cobalt oxide and molybdenum oxide within the carrier. HF may be incorporated within the catalyst during the co-precipitation, co-gelation or impregnation step during which step the cobalt oxide and molybdenum oxide are incorporated in the carrier. While the HF promoted cobalt oxide-molybdenum oxide-alumina catalyst is highly preferred it may be desirable to use HF promoted group VI A metal oxides supported on an inert carrier e. g., HF promoted chromium oxide, or molybdenum oxide, or tungsten oxide on alumina or an HF promoted group V A metal oxide carried on a support e. g. HF promoted vanadia on alumina.

The reaction may be carried out when using any of a wide variety of olefins and isoparaffins which boil preferably below about 300° F. While normally liquid hydrocarbons i. e., boiling above 70° F., may be used, the normally gaseous i. e. boiling below 70° F., olefins and isoparaffins are especially preferred. Thus olefins such as propene, butenes, pentenes, hexenes, heptenes, octenes, etc. and the various isomers thereof such as 1-butene, 2-butene, isobutene, 1-pentene, etc. and various mixtures thereof may be employed. Polymers, copolymers, or interpolymers of olefins are suitable. Isoparaffins such as isobutane, isopentanes, isohexanes, isoheptanes, etc. and mixtures thereof can be used. In place of the isoparaffins, which are characterized by having a highly labile or reactive tertiary hydrogen atom, other hydrocarbons having a tertiary hydrogen atom may be used. For instance alkyl-, cycloalkyl-, or aryl-substituted cycloparaffins or sec-alkyl aromatics may be employed e. g. methylcyclohexane, benzylcyclohexane, isopropylbenzene, etc. The preferred olefins are butenes and propylene and the preferred isoparaffin is isobutane.

Suitable sources of the various olefins and isoparaffins are to be found in various petroleum refinery streams. Either thermally or catalytically cracked naphtha fractions which contain olefinic and isoparaffinic constituents and boil preferably below about 300° F. may be employed as the charge stock. The normally gaseous hydrocarbon streams available in the refinery are especially preferred as the hydrocarbon charge stock to this invention. Gases recovered from thermal and/or catalytic cracking units, butanes which have been subjected to isomerization and/or dehydrogenation treatments, refinery stabilizer bottoms e. g. debutanized absorption naphtha may be used in our process. A particularly desirable feed is the stabilizer gas stream from a catalytic cracking unit which consists for the most part of large amounts of isobutane, various butenes, and n-butane along with a very small amount of higher and/or lower boiling materials. The presence in the charging stock of hydrocarbons other than olefins and isoparaffins e. g. n-paraffins is not undesirable except that such materials function as diluents and reduce the effective capacity of the reactor. Ordinarily the olefins and isoparaffins should comprise at least 20% of the charging stock and preferably at least about 50% or more.

The isoparaffin to olefin ratio should be between 1:10 and 30:1, preferably between 1:1 and 10:1 e. g. 5:1. As the isoparaffin to olefin ratio is decreased below 1:1, polymerization occurs to an increasing extent, and the product may continue to polymerize and increase in molecular weight until an undesirably large amount of the product hydrocarbons boil outside the gasoline boiling range. As the isoparaffin to olefin ratio is increased above 1:1, the product may contain an increased percentage of paraffinic constituents. At the higher ratios a greater percentage of the product produced boils in the gasoline boiling range. Since gasoline-boiling range hydrocarbons are desired, an isoparaffin to olefin ratio in the neighborhood of 5:1 is preferred. It has been theorized that after two or more olefin molecules react, the hydrogen from the isoparaffins saturate the olefin so produced and form a tertiary olefin from the isoparaffin. This tertiary olefin also reacts with another olefin molecule and in turn is saturated by the hydrogen from additional isoparaffins, and so forth. The ratio of isoparaffin to olefin can thus be used to provide a mass action effect which tends to reduce or minimize the growth of the olefin polymer chain. If the refinery gas or liquid stream does not contain the desired ratio, it may be fortified with the desired gaseous or liquid isoparaffins from some other source or stream so as to provide the desired molar ratio of isoparaffins to olefins.

In the process of this invention a mixture of olefin and isoparaffin is contacted with the catalyst at a temperature of between about 50° and 500° F., preferably between about 150° and 400° F. Within this range of temperatures there is a tendency for more cracking of the hydrocarbons to occur as the temperature is increased. The octane number of the gasoline produced is lowered as the operating temperature is increased. Higher temperatures also appear to favor the formation of higher boiling products. At temperatures higher than 500° F. the theorized reaction becomes so masked by these undesirable side effects that it may no longer be practical as a process for producing gasoline blending components.

A liquid phase reaction system is preferred. When normally gaseous hydrocarbons are employed as charge stocks, pressures of between 50 and 2000 p. s. i. g. may be used to maintain at least a substantial portion of the gaseous hydrocarbons in the liquid phase while in the reaction zone. Space velocities of between about 0.1 and 10, preferably between 1 and 5, liquid volumes of hydrocarbon feed per volume of catalyst per hour may be used. A convenient method of continuous operation consists of operating parallel reactors (with up flow or down flow) which contain the supported bed of catalyst. As the activity of the catalyst diminishes to the point where it should be regenerated, one reactor will then continue to operate while the other is being regenerated. In regeneration of the catalyst air or oxygen diluted with an inert gas such as nitrogen, flue gas, or the like is employed for burning off carbonaceous material. After reducing the carbon content of the catalyst to a low level it may then be reactivated by treatment with HF, if necessary (followed by calcining if an aqueous type of HF impregnation treatment was employed), and the reactor placed back on stream.

A number of experiments were performed, certain of which illustrate the advantages to be obtained by using our invention. These runs illustrate the effect of the presence of HF in the catalyst and also of the effects of varying amounts of HF, as well as temperature effects and isoparaffin to olefin ratio. In the runs a cobalt oxide-molybdenum oxide-alumina catalyst (available commercially from Harshaw Chemical Company as a hydrodesulfurization catalyst) was employed. The Harshaw catalyst contained three weight percent CoO and nine weight percent $MoO_3$. Portions of the Harshaw catalyst were impregnated with various amounts of a five to ten weight percent aqueous HF solution. The water was boiled off and the catalyst pellets then dried followed by calcining at 850° F. for two hours in a 200 p. s. i. g. stream of hydrogen.

Separate samples (175 to 190 grams) of the HF-promoted and the non-promoted Harshaw catalyst were then evaluated for reacting olefins and isoparaffins. A continuous flow unit having an upflow fixed bed type of reactor was employed. The reactor had a lower preheating section composed of glass beads having a thermocouple therein which was used to adjust the temperature. Above this was placed the catalyst pellets, and above the catalyst pellets were again placed glass beads to provide disengaging space. Liquid feed was continuously introduced into the bottom of the reactor at room temperature and warmed in the preheat section to the desired operating temperature. Product was taken overhead and collected under pressure. It was then stabilized and distilled to yield a gasoline having a 200° C. end point. The total liquid product which consisted of that fraction containing hydrocarbons having five or more carbon atoms was measured. The gasoline content of this fraction was also determined. The octane number CFR–R of the raw gasoline was measured and in certain instances the gasoline was hydrogenated before its octane number was determined. The procedure in hydrogenation was to hydrogenate the raw gasoline over UOP nickel on kieselguhr catalyst at 300° F. and 1500 p. s. i. g. $H_2$ until no more hydrogen was taken up by the raw gasoline. The bromine number of hydrogenated gasoline was reduced to 0. Where determined, the micro-dye procedure was employed to determine paraffin and olefin contents of the raw gasoline. The results of the runs are shown in the following table:

| Run number | 1 | 2 | 3 | 4 | 5 | 6 | 7 | 8 |
|---|---|---|---|---|---|---|---|---|
| Wt. percent HF in catalyst | 0 | 0 | 0 | 0 | 5 | 5 | 10 | 10 |
| Feed composition | [1]A | [1]A | [1]A | [1]A | [1]A | [1]A | [2]B | C |
| Wt. percent propene |  |  |  |  |  |  |  | 30 |
| Wt. percent butenes | 32 | 32 | 32 | 32 | 32 | 32 | 14 |  |
| Wt. percent isobutane | 34 | 34 | 34 | 34 | 34 | 34 | 84 | 70 |
| Isoparaffin/olefins | 1.06 | 1.06 | 1.06 | 1.06 | 1.06 | 1.06 | 6.0 | 2.3 |
| Polymerization conditions: |  |  |  |  |  |  |  |  |
| Temperature, ° F | 80 | 210 | 325 | 425 | 210 | 325 | 350 | 370 |
| Pressure, p. s. i. g | 400 | 700 | 1,100 | 1,500 | 800 | 1,100 | 1,000 | 1,200 |
| Space velocity, $V_f/V_{cat}/hr$ | 0.6 | 0.3 | 0.6 | 0.8 | 0.8 | 0.8 | 0.8 | 0.8 |
| Wt. percent $C_5$+product based on olefin | 25 | 43 | 51 | 60 | 108 | 120 | 182 | 135 |
| Wt. percent gasoline in product | 96 | 96 | 95 | 88 | 73 | 39 | 52 | 58 |
| Wt. percent gasoline based on olefin | 24 | 41 | 48 | 53 | 79 | 47 | 95 | 78 |
| Octane number of gasoline CFR–R: |  |  |  |  |  |  |  |  |
| Raw gasoline, clear |  |  |  |  | 97.2 |  | 89.7 | 91 |
| Hydrogenated gasoline, clear | 99.2 | 99.3 | 90.8 | 86.8 | 85.8 | 78.8 |  |  |
| Hydrogenated gasoline, 1 cc. TEL |  |  | 98.3 | 94.8 | 94.0 | 88.0 |  |  |
| Raw gasoline composition: |  |  |  |  |  |  |  |  |
| Wt. percent olefins |  |  |  |  | 76 |  | 52 |  |
| Wt. percent paraffins |  |  |  |  | 24 |  | 48 |  |

[1] Feed A contained 1% propane, 34% isobutane, 33% n-butane, 10% isobutene, 8% 1-butene, 14% 2-butene.
[2] Feed B contained 1% propane, 84% isobutane, 14% 1-butene, 1% pentane.

By comparing runs 1 through 4 with runs 5 through 8 it will be seen that the presence of HF in the catalyst increases the amount of feed stock converted to liquid products. This percentage of feed which is converted to liquid hydrocarbons is increased by two to three fold when using the HF-promoted catalyst composition. Although the percentage of gasoline in the total liquid product produced is less, the total amount of gasoline based upon the olefins charged may be increased. The gasoline produced in accordance with our invention also contains more saturated hydrocarbons. This improves the stability of the gasoline and minimizes or eliminates the need for hydrogenating the gasoline.

Thus having described our invention, what is claimed is:

1. A process for synthesizing hydrocarbons which comprises contacting a liquid mixture of an olefin hydrocarbon and an isoparaffin hydrocarbon with a catalyst consisting essentially of between about 1 and 10 percent cobalt oxide, between about 2 and 15 percent molybdenum oxide, between about 2 and 20 percent HF, and the remainder essentially alumina, said contacting being effected at a temperature between about 150 and 210° F. and under a pressure of between about 50 and 2000 p. s. i. g. and which is sufficient to maintain at least a substantial portion of the reactants in the liquid phase.

2. A process for synthesizing normally liquid gasoline boiling range hydrocarbons which process comprises contacting a refinery gas stream consisting primarily of butenes, butane, and isobutane, said refinery gas stream being fortified with isobutane so as to provide a molar ratio of isobutane to butenes of between 1:1 and 10:1, with a catalyst consisting essentially of between about 1 and 10% by weight of cobalt oxide, between about 2 and 15% by weight of molybdenum oxide, and between about 2 and 10% by weight of HF supported on an alumina carrier, effecting said contacting at a temperature between about 150° and 210° F. and under a pressure of between 50 and 2000 p. s. i. g., which pressure is sufficient to maintain at least a substantial portion of the reactants in the liquid phase, and effecting the contacting at a space velocity of between 0.1 and 10 liquid volumes of hydrocarbon per volume of catalyst per hour whereby normally liquid gasoline boiling-range hydrocarbons are produced.

References Cited in the file of this patent

UNITED STATES PATENTS

| | | |
|---|---|---|
| 2,332,276 | Stahly | Oct. 19, 1943 |
| 2,364,430 | Ellis | Dec. 5, 1944 |

FOREIGN PATENTS

| | | |
|---|---|---|
| 536,528 | Great Britain | May 19, 1941 |